(12) United States Patent
Gunther (10) Patent No.: US 10,118,631 B2
(45) Date of Patent: Nov. 6, 2018

(54) COMBINED HAND TRUCK AND RAISED SUPPORT STAND FOR EQUIPMENT

(71) Applicant: Sheldon Jay Gunther, Vysocany (CZ)

(72) Inventor: Sheldon Jay Gunther, Vysocany (CZ)

( * ) Notice: Subject to any disclaimer, the term of this patent is extended or adjusted under 35 U.S.C. 154(b) by 0 days.

(21) Appl. No.: 15/699,281

(22) Filed: Sep. 8, 2017

(65) Prior Publication Data

US 2018/0079437 A1 Mar. 22, 2018

(30) Foreign Application Priority Data

Sep. 16, 2016 (CZ) ..................................... 2016-571

(51) Int. Cl.
  *B62B 1/12* (2006.01)
  *B62B 1/00* (2006.01)

(52) U.S. Cl.
  CPC .............. *B62B 1/12* (2013.01); *B62B 1/008* (2013.01); *B62B 2206/006* (2013.01)

(58) Field of Classification Search
  CPC ........................... B62B 1/12; B62B 2206/006
  See application file for complete search history.

(56) References Cited

U.S. PATENT DOCUMENTS

| | | | |
|---|---|---|---|
| 3,684,307 A * | 8/1972 | Bourgraf | B62B 1/12 280/47.24 |
| 4,448,434 A | 5/1984 | Anderson | |
| 4,846,486 A * | 7/1989 | Hobson | A47C 4/52 280/47.25 |
| 5,263,727 A | 11/1993 | Libit et al. | |
| 5,362,078 A * | 11/1994 | Paton | B62B 1/12 280/35 |
| 5,971,424 A | 10/1999 | Ingalls | |
| 6,196,560 B1 * | 3/2001 | Ohlsson | B62B 1/12 182/20 |
| 6,942,228 B2 * | 9/2005 | Bunce | A01M 31/006 280/1.5 |
| 7,077,421 B2 * | 7/2006 | Wu | B25H 1/04 280/30 |
| 7,464,947 B2 | 12/2008 | Cortese | |
| 7,487,947 B2 * | 2/2009 | Liu | B25H 1/04 248/284.1 |
| 8,047,553 B2 * | 11/2011 | Voong | B25H 1/04 248/129 |
| 9,623,551 B1 * | 4/2017 | Bowen | B25H 5/00 |
| 2004/0201186 A1 | 10/2004 | Tornabene | |
| 2005/0212236 A1 * | 9/2005 | Tiramani | B25H 1/04 280/47.18 |
| 2008/0067786 A1 * | 3/2008 | Liu | B25H 1/04 280/639 |

(Continued)

*Primary Examiner* — Emma K Frick
*Assistant Examiner* — Brian L Cassidy
(74) *Attorney, Agent, or Firm* — Gary S. Engelson (57) ABSTRACT

A combination hand truck and equipment stand to be used by musicians, sound reinforcement companies and sound personnel, lighting companies and lighting personnel, clubs, schools, theaters, concert halls and Houses of Worship for transporting equipment (instrument amplifiers, sound and lighting consoles, speaker enclosures, audio processing racks and general miscellaneous equipment) transforms into a stand for said musical instrument amplifiers, sound and lighting consoles, standard 19" audio equipment racks, stage monitors, loudspeaker enclosures, and storage boxes, etc.

14 Claims, 7 Drawing Sheets

(56) References Cited

U.S. PATENT DOCUMENTS

| | | | |
|---|---|---|---|
| 2011/0074124 A1* | 3/2011 | Schnarr | B62B 1/12 |
| | | | 280/30 |
| 2012/0153584 A1* | 6/2012 | Ryan | B62B 1/004 |
| | | | 280/33.991 |
| 2012/0153587 A1* | 6/2012 | Ryan | B62B 1/12 |
| | | | 280/47.27 |
| 2012/0153710 A1* | 6/2012 | Ryan | B62B 1/12 |
| | | | 301/111.01 |
| 2013/0328279 A1* | 12/2013 | Feick | B62B 3/00 |
| | | | 280/47.18 |
| 2014/0110447 A1* | 4/2014 | Hilley | B62B 5/00 |
| | | | 224/401 |
| 2015/0020677 A1 | 1/2015 | Perry | |
| 2015/0298715 A1* | 10/2015 | Kukulies | B62B 1/008 |
| | | | 280/47.24 |
| 2016/0257327 A1* | 9/2016 | Gayk, Jr. | B62B 1/12 |
| 2017/0096156 A1* | 4/2017 | McAleenan | B62B 1/12 |
| 2017/0326019 A1* | 11/2017 | Bramsiepe | A61H 3/04 |

* cited by examiner

COMBINED HAND TRUCK AND RAISED SUPPORT STAND FOR EQUIPMENT

BACKGROUND

The hand truck and raised support stand of the present invention is suitable for application to numerous industries, including for example music, sound, and lighting industries, including live, recorded performance such as DJ work, and recording studio applications. For the purpose of explaining the invention and its advantages, but without limiting the scope of the invention, the detailed description will focus on two main, exemplary industry categories: 1. Music industry and 2. Sound and Lighting industry. The invention is useful in both industry categories, as well as others, and relates to and applies to the cross-industry categories of "consumer," "semi-professional," and "professional" equipment.

Within certain industry classifications, the invention would be categorized as a tool and/or peripheral.

Presently there exist a wide variety of equipment stands. Some examples in wide use include small foldable tri-pod tilt-stands and other types of larger foldable tilt-stands. That is, there are at present, hand trucks/carts with wheels available for transporting equipment and other apparatuses used for elevating equipment.

SUMMARY

Some shortcomings of known apparatus that have been noted by the Applicant include: being too low for access to the controls, they tilt making access to the equipment controls difficult if not impossible or they are large and require the operator to carry another large piece of equipment. Another negative aspect of existing stands noted by the Applicant is that they are made specifically for music amplifiers and will not accommodate other types of equipment like audio mixing and lighting consoles and loudspeaker enclosures, etc., which have different physical characteristics from each other. None of the known apparatus allow the musician/operator to both transport their equipment and also use the same apparatus as a stand. There are presently no apparatuses available that combine transportation and elevation features into one apparatus for these applications. Embodiments of the present invention solve these problems.

According to one aspect of the invention, the combined hand truck with support platform, primarily used for transport and placement of combo reproduction equipment, is comprised of a frame with two wheels and folding elements; which is comprised of a stand with transport platform, wherein the stand is divided into two parts by a support platform hinge with a locking system, where the upper part of the stand, upon tilting to working position, forms the frame support platform for placement of the combo audio reproduction equipment, whereas to this support platform the support bars of the stand are inserted at their free ends for a fixed connection to the transport platform, thus enabling tilting the support platform towards the transport platform, and where the stand is equipped with a stabilizing support to increase the strength of the construction frame in functional position with tilted support platform. In a variation, of the forgoing aspect of the invention, the combined hand truck with support platform has a tubular construction frame in the lower section comprises two support parallel props of the main frame with wheels attached to them with two cross members that form the fixed main frame in the shape of a parallelogram, where these props are in the area of the wheels respectively connected by hinges to the frame of the transport platform having at least one cross member, and where the upper section of the stand comprises the tubular construction frame of the support platform with longitudinal and cross elements, which has a protruding stop bar, and also has adjustable supports formed by the support bars, whereas an adjustable stabilizing support is connected to the upper cross member of the upper section of the stand frame and is adapted for connection to the cross member of the frame of the transport platform in the functional position of tilted support platform of the hand truck. In a further variation, the stop bar forms a rest for the combo audio reproduction equipment located on the support platform. In another variation of the combined hand truck with support platform, the free ends of the support bars in tilted functional position of the support platform are inserted into the holes of the frame of the tilted transport platform. In yet another variation of the combined hand truck with support platform, the wheel axles of the wheels are respectively fixed to the corresponding wheel mounting plates permanently fixed to the shaped lower section of the corresponding support parallel props of the main frame. In another variation of the combined hand truck with support platform, the functional position of the folded hand truck the support bars are fixed to the props of the main frame in the lower section of the construction frame by means of the support bar screw.

In the following description reference is made to the accompanying drawings, which form a part hereof, and in which are shown example implementations. It should be understood that other implementations are possible, and that these example implementations are intended to be merely illustrative.

DETAILED DESCRIPTION

The following section explains the invention and its characteristics through the description of illustrative, exemplary embodiments and their variations.

The term "active enclosure" (the amplifier is located with the loudspeaker(s) in one enclosure) and "passive enclosure" (loudspeaker(s) in an enclosure without a built-in amplifier) are standard industry terms and relate to the industry categories.

For industry category 1, one purpose of the invention is to aid in transporting and to provide an elevated platform or stand, for and not limited to: active and passive amplifier/loudspeaker reproduction systems used for electric guitars, electro-acoustic guitars, electronic drums, electronic keyboards and electric bass guitars, as well as, active and passive enclosures relating to public address, sound reinforcement and stage monitors or other similar audio reproduction devices.

For industry category 2, one purpose of the invention is to aid in transporting live sound consoles/desks, outboard equipment rack enclosures and lighting control consoles/desks. In addition, to an easier means of transporting this equipment, the invention provides a stand designed for placement of this equipment for its intended purpose of operation. Tables are typically used for live audio and lighting console elevation for operations. Wheels, carts with wheels, and man-power are typically used in transporting these consoles.

The term "device(s)" herein shall refer to all stated above.

The present invention relates to hand trucks and moveable carts for transporting devices, as well as specialized stands, chairs and tables used to elevate these devices to an operational position. These two separate functions (transportation and stand) are combined into one object with this apparatus.

In view of the foregoing disadvantages inherent in the known types of transporters and stands now present in the aforementioned industries, embodiments of the invention provide a new combination of two separate functions allowing for easy device handling/transporting, device elevation, easier control access and safety.

Devices are generally heavy, difficult, and awkward to transport by hand. In the case of music devices, they range in various sizes and weights depending on the size of the enclosure, loudspeaker(s) and type of amplifier, whether it be vacuum tube, transistorized or a combination thereof. Due to their size and weight, carrying such devices upstairs or downstairs or carrying them some distance can be a physical challenge and greatly increases the risk of physical harm.

When setting up a category 1 device (music amplifiers in particular) for a performance or practice, the device is typically placed on the floor which is not optimal for listening by the musician or performer or for adjusting controls. Alternatively, a category 1 device is placed on a table which is typically too large to be practical. A chair may also be used for the device but may not be safe due to the device's weight, size and center of gravity.

Category 2 devices are also heavy and difficult to transport. In the case of a sound console, a power amplifier may be integrated into the console adding substantial weight to the device. They are typically rolled in a special case or hand carried. Once they are at their optimal setup location, they are typically placed on a table for operation. Category 2 stage monitors typically require a space on stage or podium that may not be available. The invention allows the monitor to be located off stage to create more space on stage for the performers.

There are three transformative configurations (positions) for embodiments of the invention: 1. Storage, 2. Transport, and 3. Stand.

Figure 1:
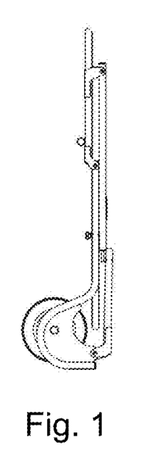
FIG. 1 is a side view of an embodiment of the invention in storage configuration.
Figure 1A:
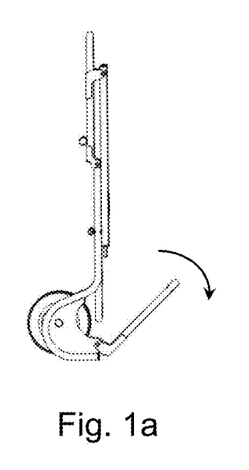
FIG. 1a is a side view of the embodiment of FIG. 1 transitioning to transport configuration.
Figure 2:
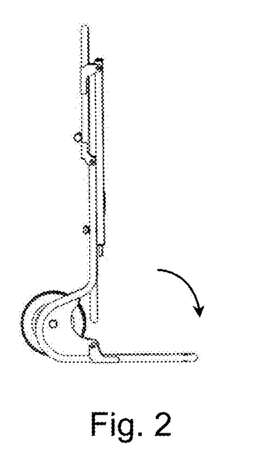
FIG. 2 is a side view of the embodiment of FIG. 1 in transport configuration.
Figure 2A:
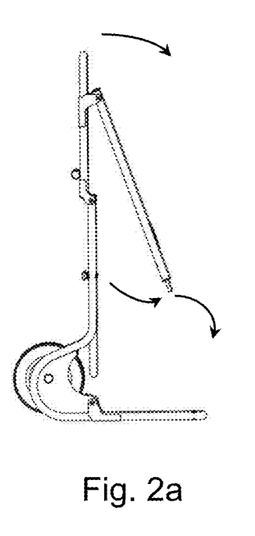
FIGS. 2a and 2b are side views of the embodiment of FIG. 2 transitioning to stand configuration.
Figure 2B:
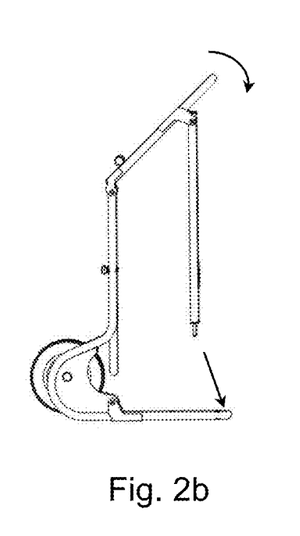
Figure 3:
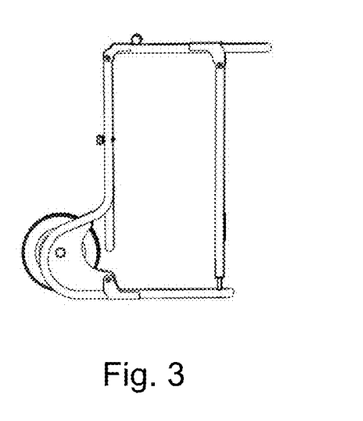
FIG. 3 is a side view of the embodiment of FIG. 2 in stand configuration.

The following refers to these configuration types:
1. Storage—the device will be in an "I" configuration (FIG. 1);
2. Transport: the device will be in an "L" configuration (FIG. 2); and
3. Stand: the device will be "box-like" in configuration (FIG. 3).

One general purpose of embodiments of the present invention, which will be described subsequently in greater detail is to provide a new way of transporting and elevating devices, and other novel features that result in a new type of transport/elevation system as a combination which is not anticipated, rendered obvious, suggested or even implied by any known apparatus.

According to an exemplary embodiment, there are three frames (stand, main and transport) joined by hinges: two hinges connect the stand frame to the main frame. Two hinges join the transport frame to the main frame.

This embodiment of the invention is constructed of a stainless-steel tubing frame. Stainless steel provides a sufficient strength-to-weight ratio to support the required loads, giving the best support and lightest weight with greatest strength. Other metal types, plastics, resins, fibers, composites or any combination thereof may also be used in construction providing they can safely accommodate the required load limit.

The main frame 1 remains vertical in all three configurations (FIGS. 1, 2, and 3) and is designed to be free-standing upright without the assistance of the transport platform 2 for free-standing stability. The stand frame 3 remains vertical in the transport configuration (FIG. 2) creating a means for using the apparatus of this embodiment as a hand truck i.e. it becomes the handle, and can pivot downward to become the stand (FIG. 3). The transport platform frame 2 can be pivoted upward to a vertical position for the storage configuration (FIG. 1) or pivoted downward to the floor for the transport configuration (FIG. 2). In the stand configuration (FIG. 3), the stand platform 3 is no longer functional as a handle for transporting devices.

The transport 2 and stand 3 frames are designed to accommodate a large variety of Category 1 device sizes. These frames with their cross-members are sized and spaced to avoid contact with rubber and/or plastic feet attached to the bottom of most devices. The intent is for the device enclosure to come directly into contact with the frames' surface and not the attached feet creating greater stability when the device is placed on the frames.

The exemplary embodiment incorporates 8-inch (200 mm) pneumatic wheels 4 for transporting devices. This wheel size is optimal for going up and down stairs and rough surfaces. In addition, pneumatic wheels are optimal for a smoother and safer ride when transporting active music amplifiers that contain a vibration-sensitive, vacuum tube-type amplifier, and/or spring reverb tank. Suitable plastic, rubber or polyurethane wheels are also available, but should be selected to be vacuum tube friendly. The wheels and their axles shall support and transport up to 100 pounds (~45-kilos), or such other design weight as the expected equipment types may reach. The wheels 4 are located at the rear of the apparatus and are in a position and distance behind the main frame 1 vertical tubes to help prevent the apparatus from tilting backwards and falling over when in the stand position i.e. that act as a tilt limit with a device in place on the stand 3.

Exemplary embodiments should accommodate various types, sizes, and weights of devices for both transporting (FIG. 2) and as a stand (FIG. 3) with a load rating of up to 100-pounds (~45-kilos), or such other design weight as the expected equipment types may reach. The apparatus, for use by the previously listed industries, can also transport equipment other than those stated above providing they do not exceed the design load maximum.

The uppermost height of the stand platform frame 3 of some embodiments when in the stand position should not exceed substantially 25.5-inches (648 mm). When a device such as a sound or lighting console is placed on such embodiments for operation, this height provides the optimal height for both operation of the equipment so supported and leg clearance under the stand frame 3 for the operator.

Two (2) vertical support legs 18 attached to the stand frame 3 via any suitable fastener, such as stand platform hinges 14, are for the stand and transport configurations and can support up to 100-pounds (~45-kilos) or such other weight as required by the equipment to be supported as the applied load.

The stand frame 3 has two functions: 1. As a handle for the hand truck while in the transport configuration i.e. when the stand frame 3 is locked in a vertical upright position via the two (2) captive knob screws 10 that secure the support legs 18 to the main frame 1. At which time the stand frame 3 becomes the transport handle as in a standard hand truck and 2. As a platform when in the stand configuration with the support legs 18 released from the main frame 1 and lowered to a right angle to the main platform 3 and parallel to the main frame 1.

The transport platform 2 of embodiments of the apparatus is pivoted from horizontal to vertical to reduce its footprint size for storage purposes (FIG. 1) by raising the front of the transport platform to a vertical position. There are two (2) hinges 11 located in the rear of the transport platform 2 which attach the transport platform frame 2 to the main frame 1.

Figure 14:
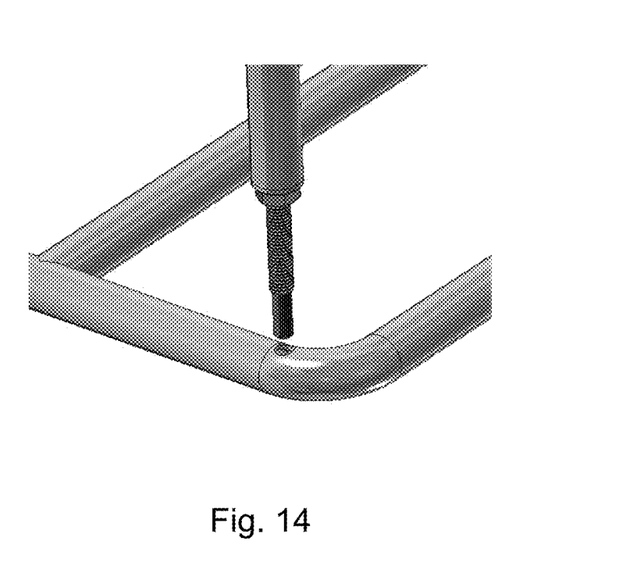
FIG. 14 is a detail view of the vertical support leg assembly of the embodiment of FIG. 1.

Embodiments of the apparatus can be transformed into the stand configuration (FIG. 3) by releasing the knob screws or captive screws located on the main frame, which secures the main frame to the support legs, and then by moving forward and lowering the stand frame and support legs of the device, and by placing the support legs 18 into their respective stand positions located on the transport frame (FIG. 14).

The support legs 18, when secured to the main frame using the captive knob screws 10, the stand frame 3 becomes the handle for the apparatus of this embodiment, providing leverage for moving the load placed on the transport frame and wheels during transport e.g. transport configuration. When the support legs 18 are released from the main frame 1 and the stand platform 3 is lowered and the support legs pins 19 are inserted into the transport frame holes 13 (FIG. 14), the device stand configuration is achieved.

The present invention is now illustrated by the following more detailed description of one exemplary embodiment. Variations, such as modifications to certain geometries illustrated or fasteners used will be apparent to skilled artisans and are intended to be within the scope of the principles of the invention.

Figure 4:
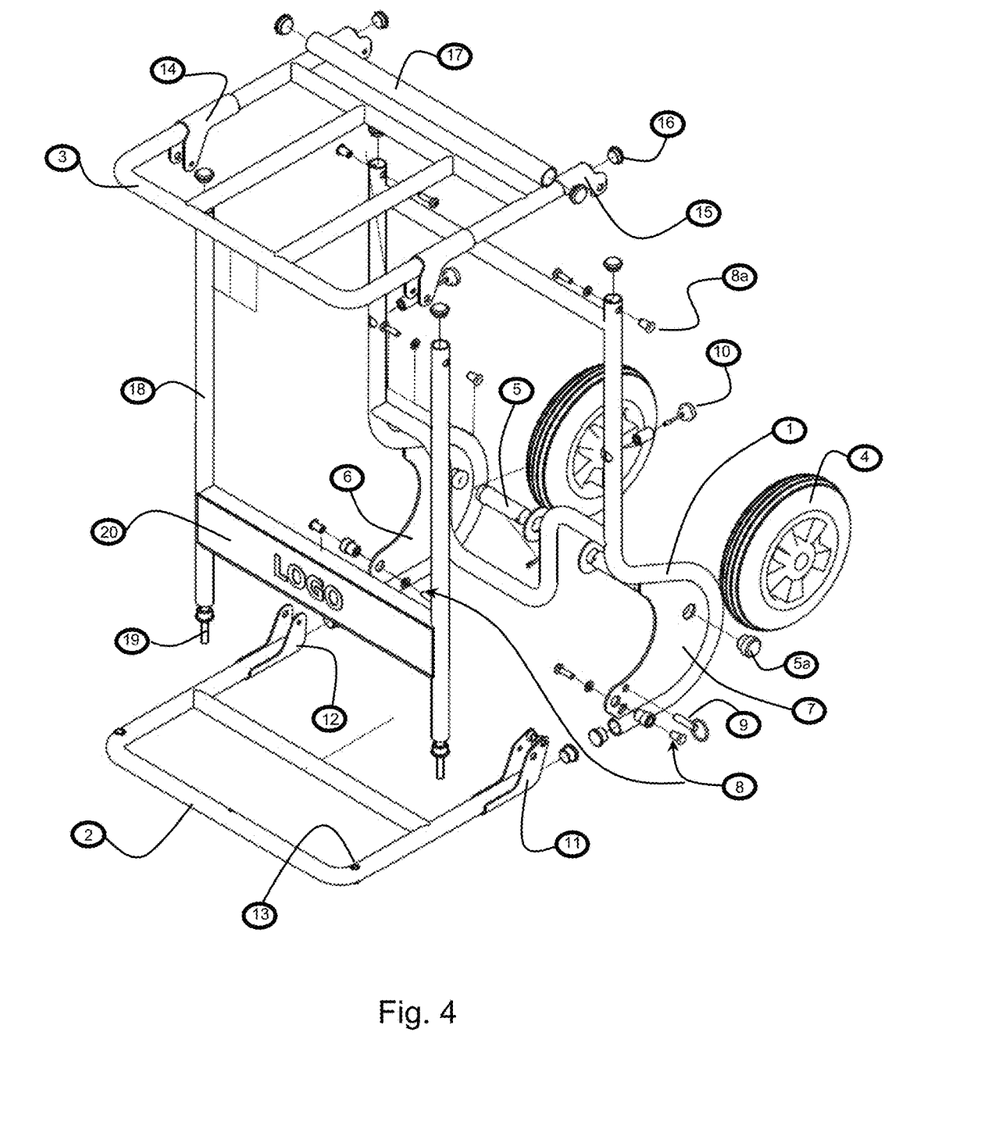
FIG. 4 is an exploded isometric view of the embodiment of the invention of FIG. 1.

The illustrated embodiment is comprised of three (3) frame systems as shown in FIG. 4. The main frame 1, transport frame 2 and stand frame 3.

The main frame 1 is comprised of two (2) vertical tubes, and two (2) tube cross-members joining these two vertical tubes together to form a completed frame.

There are two (2) wheel axle mounting plates 6, 7 welded to the lower part of the main frame vertical tubes in the curved section shaped to accommodate these plates. These plates are for attaching the transport wheels 4 via axle shafts 5 and mounting hardware 5a. One or both axle plate locations may utilize the transport platform locking system 7.

Figure 5:
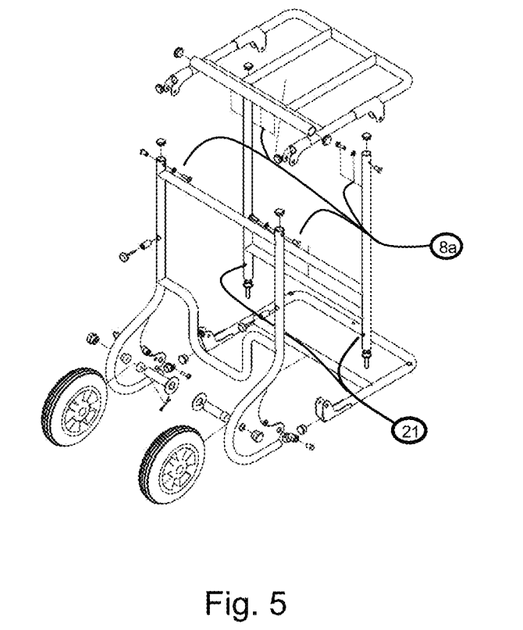
FIG. 5 is an exploded isometric view of the embodiment of the invention of FIG. 1 from the opposite side.
Figure 9:
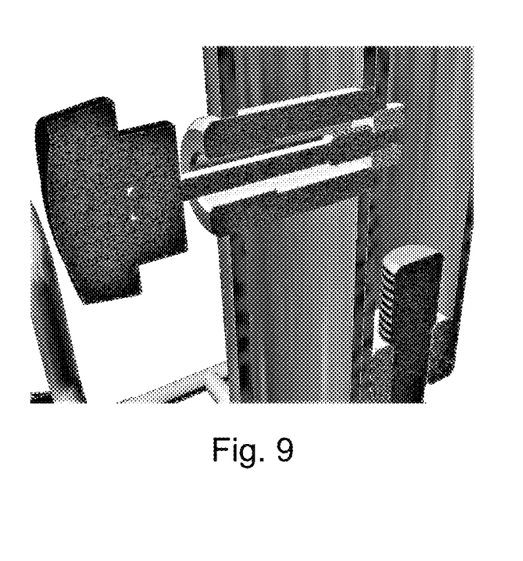
FIGS. 9 and 10 are detail views of the captive knob screw assembly of the embodiment of FIG. 1.
Figure 10:
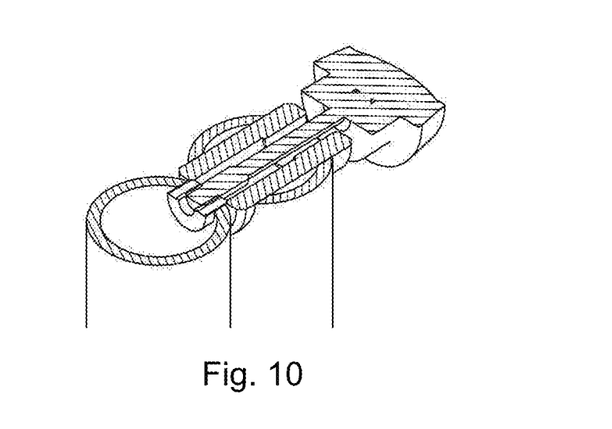

Above the axle mounting plates 6, located on each main vertical tube are captive knob screws and their associated captive bushings 10. These knob screw assemblies (knob, screw and bushing) 10 are mounted thru-hole and with the bushing permanently mounted (welded or press-fit) into each main tube 1. The knob screws 10 are free to protrude past the main tube 1 to be exposed and ready to capture the threaded bushing (FIG. 5, 21) attached to its respective support leg 18. When not connected to the threaded receiving bushings (FIG. 5, 21), the captive knob-screw 10 (See also, FIGS. 9 and 10) is free to float forward and back in its bushing without falling out.

Other locking elements like cam lever or clamp lock systems may be used with equal efficiency if sized to accommodate the required shear strength.

Sealing the ends of the tubing are four (4) tubing caps 16. These caps can be metal or plastic. Any other suitable means of rendering the tube ends safe for handling may be used.

Figure 12:
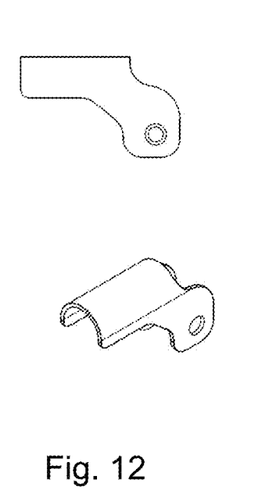
Figure 13:
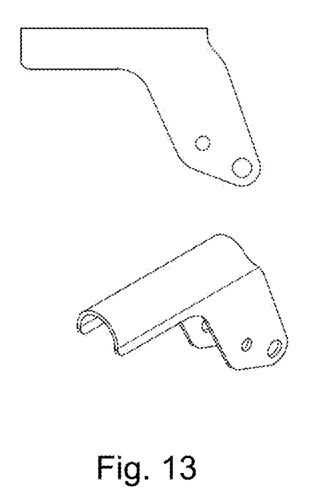

Two (2) stand hinges is (See also, FIGS. 11-13) connect to the upper end of the main frame via the hinge mounting screw hardware 8a.

The main vertical tubes of the main frame 1 can be made adjustable in conjunction with the support legs 18 to increase or decrease the height of the stand frame allowing the user to adjust for different applications, whether it be for Category 1 or Category 2 devices. Height requirements may differ for the two Categories.

The main frame axle plates 6, 7 (See also, FIGS. 6-8) are used for mounting the wheel axle assemblies 5, 5a and the wheels 4.

There are two different styles of axle plate. A simple plate 6 with one (1) mounting hole for the wheel axle assembly is shown in FIG. 4, as is an alternate version, 7 (See also, FIGS. 6-8) having an additional hole and slot to receive a quick release pin 9 for locking the platform 2 into either the transport position (hole) or storage position (slot) (hinge 11). This style axle plate 7 can be used on one side or both sides. The advantage for using it on both sides will be for the benefit of right and left-handed operators, for fixation of the transport platform 2 and for greater stability when in the stand position.

A standard quick release ball pin 9 is shown. Alternates like indexing plungers and push-button self-locking ball lock pins are also an acceptable means of locking the transport frame to the transport and storage positions. These pins must be sized in length to pass through the entire hinge. (See, FIGS. 7 and 8.)

This embodiment of the present invention uses 8" (200 mm) pneumatic wheels and tires 4. The recommended axle size is a minimum of ¾" (20 mm) in diameter to carry/transport the rated weight. Because of the necessary width of the object to accommodate the devices, the wheels are located to the inside of the axle plates vs the normal outside as in common hand trucks. This allows for passage through standard and narrow doorways and on public transportation while maintaining movement stability. For the illustrative embodiment, two axles are shown. A single continuous axle may alternatively be used.

The transport frame 2 is made of a single u-shaped tube frame with a single cross-support member. The crossmember is located between the front and rear of the u-frame parallel to the front tube of the frame, and provides frame stability and support for the device.

This frame can be made from metal, plastic, resin, fibers, composite or any combination thereof providing it supports the required load safely.

Figure 11:
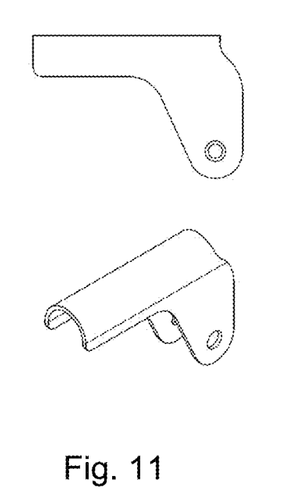
FIGS. 11, 12, and 13 are detail views of hinges used in the embodiment of FIG. 1.

At the rear end of the frame are located the transport platform hinges 11, 12. These hinges are made from laser cut sheet steel and formed in the shape as shown in FIG. 11. The hinge wraps around the frame tube and is welded to the tube.

There are two different types of hinges 11, 12 for the transport platform 2. (See also, FIGS. 11, 13.) However, locking transport platform hinge 11 (FIG. 12) may be used on both the left and right sides of the transport frame for securing the transport platform in the stand, transport and storage positions. If the locking hinge 11 (FIG. 12) and pin 9 are used to replace the platform simple hinge 12 without locking capability, the corresponding wheel axle mounting plate 7 must be used.

Figure 6:
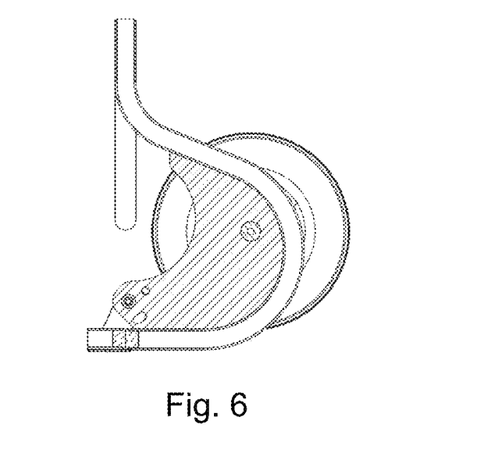
FIGS. 6, 7, and 8 are detail views of the wheel assemblies of the embodiment of FIG. 1.
Figure 7:
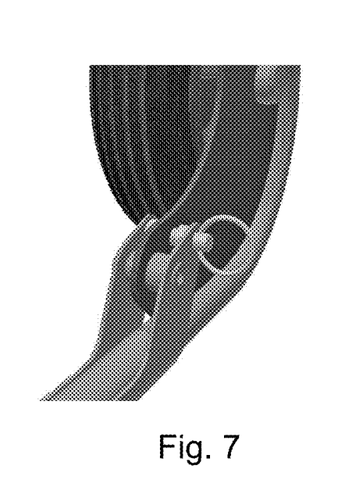
Figure 8:
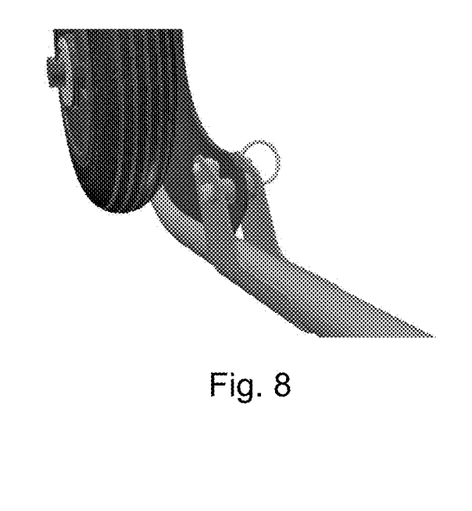

To lock the transport frame 2 into either the transport or storage position, the quick release ball pin 9 is inserted into the hole located for this pin in the transport platform hinge 11 (FIGS. 7 and 8); passing through the hinge holes and axle plate to its final position preventing platform up/down movement. When in the stand position, this prevents forward/back movement of the stand structure. To change to the transport platform position, the pin 9 must be removed and reinserted into its associated slot on the locking axle plate. (FIGS. 6-8.)

A standard quick release ball pin 9 for locking the transport platform 2 into the transport and storage positions is shown. Alternates like indexing plungers and push-button self-locking ball lock pins are also an acceptable means of locking the transport frame to the transport and storage positions, as are locking tabs, screw knobs, stabilizing supports, and other suitable locking systems. Locking pins should be sized in length to pass through the entire hinge (FIGS. 7 and 8). Alternates such as indexing plungers, push-button self-locking ball lock pins, locking tab systems, screw knobs, stabilizing support, or any similar type locking system, as well as any other means for preventing the transport to main frame hinge from moving while in the transport or stand position are also an acceptable means of locking the transport frame to the transport and storage positions.

A similar locking system may be used at the stand to main frame hinge (FIG. 4, 15) for additional stability when in the stand position, or for any other hinge desired, in the illustrated, or other, embodiments.

These hinges can be made from metal, plastic, resin, fibers, composites, or any combination thereof providing they can handle the required maximum load.

Sealing the ends of the tubing are two (2) tubing end caps 16. These caps can be metal or plastic. Any other suitable means of rendering the tube ends safe for handling may be used.

Stand frame 3 is made of a single u-shaped tube frame with three (3) cross members; two (2) tubes (perpendicular to the front tube surface while on the same plane) and a single horizontal tube, parallel to the front tube surface and behind the two perpendicular tubes. These tubes are welded to each other and the u-shaped frame to provide stability and support for the device.

The stand's u-frame size and crossmembers are located and spaced as to not interfere with the rubber or plastic feet located on the bottom of most devices.

There are two (2) hinges 15 (FIG. 12) with their associated hardware 8a connecting the stand frame 3 to the main frame 1.

There are two (2) hinges 14 and their associated hardware 8a for attaching the support legs 18 to the stand frame 1.

This frame can be made from metal, plastic, composite or any combination thereof providing it supports the required load safely.

Closing the ends of the a-tubing are two (2) tubing end caps (FIG. 1-16). These caps can be metal or plastic. Any other suitable means of rendering the tube ends safe for handling may be used.

The two (2) support legs 18 are made of steel and support much of the load from the devices in conjunction with the main frame and stand frame structures.

There are two (2) tubing cross-members shown on the drawing (FIGS. 4 and 5, 20) which, connect the two independent support legs and provide a position to weld, screw, glue or rivet a "logo" plate for advertising the manufacturer(s)' name and/or product name. If the 'logo' plate is not required, one cross-member tube is sufficient.

There are two (2) steel end caps with steel rods located at the base of the support legs which are designed and sized to be fully inserted into the transport stand hole and bushing locations with minimal clearance (FIG. 14). Their purpose is to secure the support legs 18 to the transport platform 2 preventing collapse and forward/backward movement of the stand platform when in the stand position.

The two (2) support leg tubes 18, when fully released from the main frame 1 via loosening and releasing of the support leg captive knob screws 10, are to move forward, and the guide posts 19 are inserted into the transport frame 2 receiving hole/bushings 13 (FIG. 14) to support and secure the stand frame platform 3 at a 90-deg. angle to the main frame 1 creating the stand position.

The hinges 14 used for connecting these support legs 18 to the stand frame 3 are also shown in FIG. 11 and use mounting hardware 8a.

Closing the ends of the tubing are two (2) tubing end caps 16. These caps can be metal or plastic. Any other suitable means of rendering the tube ends safe for handling may be used.

These support legs 18 can be made adjustable in conjunction with the main frame to increase or decrease the height of the stand frame 1 allowing the user to adjust for different applications, whether it be for Category 1 or Category 2 devices. Height requirements may differ for the two Categories.

Stop bar 17 prevents the equipment placed on the stand frame 3 from sliding past the approximated center point of equal weight distribution, based on an approximate speaker location within most music device enclosures. That is, the stop bar 17 encourages correct device placement between the front and rear of the apparatus of this embodiment, i.e. it acts as an optimal placement point with the bottom-rear of the music device placed against the stop bar. This stop bar 17 is sized to provide clearance for connections to the rear of sound and lighting console devices in addition to the aforementioned purpose.

Sealing the ends of the tubing are two (2) tubing end caps 16. These caps can be metal or plastic. Any other suitable means of rendering the tube ends safe for handling may be used.

Hinges 11, 12, 14, 125, (FIGS. 11-13) and Hinge Mounting Hardware 8, 8a are described. The hinges 11, 12, 14, 15, are formed from laser cut flat steel and formed to wrap evenly around the frame tube. These hinges can be metal, plastic, fiber, resin, composite or any combination thereof providing they can support the device maximum load.

The hinge mounting hardware 8, 8a, consists of screws, bushings, threaded bushings and washers. Standard washers, bolts and nuts may also be used. They are to be sized (diameter and shear strength) to accommodate the maximum device weight load.

Figure 15:
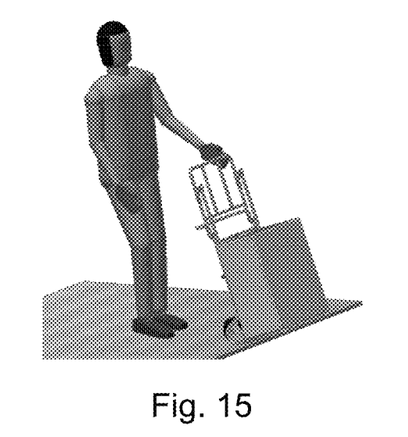
FIG. 15 is an isometric view of the cart in use for transportation.
Figure 16:
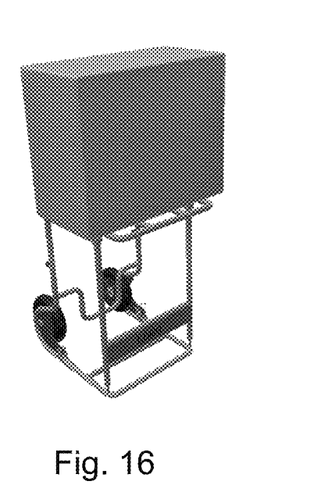
FIG. 16 is an isometric view from a first angle of the cart in use as a stand.
Figure 17:
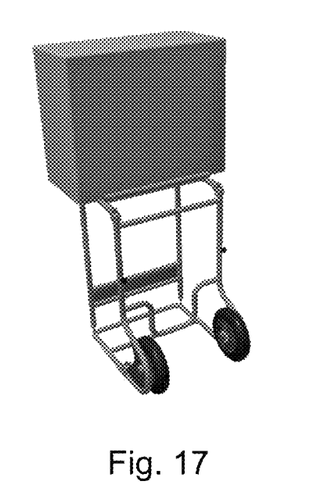
FIG. 17 is an isometric view from a second angle of the cart in use as a stand.

FIGS. 15-17 show the exemplary embodiment as it appears in use. In FIG. 15, a user is shown wheeling the embodiment in transport configuration with a piece of equipment on the transport platform. FIGS. 16 and 17 show the embodiment in stand configuration with a piece of equipment on the stand platform. FIG. 16 shows the front of the exemplary embodiment, while FIG. 17 shows the back of the exemplary embodiment.

Various combinations of the foregoing features and elements can be made, and are contemplated as within the scope of the present invention.

What is claimed is:

1. A combined hand truck with a support platform, primarily used for transport and placement of devices, comprising:
    a frame with two wheels and folding elements including a stand and a transport platform, wherein
    the stand is divided into two parts by a support platform hinge with a locking system, where
    the stand has an upper part which, upon tilting to a working position, forms the support platform for placement of the devices, from which support bars depend, whereas
    to this support platform the support bars of the stand are inserted at their free ends into fixed connections of the transport platform, the support platform capable of tilting down towards the transport platform by removing the free ends of the support bars from the fixed connections, and where
    the stand is equipped with a stabilizing support to increase the strength of the frame with the support platform tilted into the working position, and wherein
    the free ends of the support bars in tilted functional position of the support platform are inserted into holes defined in the frame of the tilted transport platform.

2. The combined hand truck with support platform according to claim 1, wherein the frame has a tubular construction and in a lower section comprises two parallel props of the frame with the wheels attached to the parallel props with two cross members that form the fixed main frame in the shape of a parallelogram, where parallel props are in the area of the wheels respectively connected by hinges to the frame of the transport platform having at least one cross member, and where the upper section of the stand comprises the tubular construction frame of the support platform with longitudinal and cross elements, which has a protruding stop bar, and also has adjustable supports formed by the support bars, whereas an adjustable stabilizing support is connected to the upper cross member of the upper section of the stand frame and is adapted for connection to the cross member of the frame of the transport platform in the working position of tilted support platform of the hand truck.

3. The combined hand truck with support platform according to claim 2 wherein the stop bar forms a rest for the devices located on the support platform.

4. The combined hand truck with support platform according to claim 2 wherein wheel axles of the wheels are respectively fixed to corresponding wheel mounting plates permanently fixed to the lower section of the parallel props of the main frame.

5. The combined hand truck with supporting platform according to claim 2 wherein in the working position of the folded hand truck the support bars are fixed to the parallel props of the main frame in the lower section of the construction frame by means of a knob screw.

6. The combined hand truck with supporting platform according to claim 1, the support platform further including cross-members sized and spaced to avoid contact with equipment feet attached to a bottom surface of the devices.

7. The combined hand truck with supporting platform according to claim 1, wherein the wheels are pneumatic.

8. The combined hand truck with supporting platform according to claim 7, wherein the wheels have a diameter sufficient to move over stairs and rough surfaces.

9. The combined hand truck with supporting platform according to claim 1, wherein the wheels support a combined weight of 100 pounds.

10. The combined hand truck with supporting platform according to claim 4, wherein the wheel mounting plates are located sufficiently behind the frame to prevent the apparatus from tilting backwards.

11. The combined hand truck with supporting platform according to claim 1, wherein the support platform is not more than substantially 25.5 inches.

12. The combined hand truck with supporting platform according to claim 1, wherein in the working position of the folded hand truck the support bars are fixed to the parallel props of the main frame in the lower section of the construction frame by means of at least one of a cam lever and a clamp lock.

13. The combined hand truck with supporting platform according to claim 1, wherein the frame further includes defined therein at least one hole to receive a ball pin that locks the transport platform into the working position.

14. The combined hand truck with supporting platform according to claim 1, wherein the frame is tubular and constructed of one of stainless steel, another metal, a plastic, a resin, a fiber, and a composite adequate to support the devices.

* * * * *